United States Patent
Chen et al.

(10) Patent No.: US 9,825,971 B2
(45) Date of Patent: Nov. 21, 2017

(54) ANONYMOUS SERVER BASED USER SETTINGS PROTECTION

(71) Applicant: Microsoft Technology Licensing, LLC, Redmond, WA (US)

(72) Inventors: Shuo Chen, Bellevue, WA (US); Zhenbin Xu, Sammamish, WA (US); Boxin Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 14/779,072

(22) PCT Filed: Apr. 24, 2013

(86) PCT No.: PCT/CN2013/074586
§ 371 (c)(1),
(2) Date: Sep. 22, 2015

(87) PCT Pub. No.: WO2014/172850
PCT Pub. Date: Oct. 30, 2014

(65) Prior Publication Data
US 2016/0050218 A1    Feb. 18, 2016

(51) Int. Cl.
*G06F 21/00* (2013.01)
*H04L 29/06* (2006.01)
(Continued)

(52) U.S. Cl.
CPC .............. *H04L 63/12* (2013.01); *G06F 21/56* (2013.01); *G06F 21/57* (2013.01); *G06F 21/602* (2013.01);
(Continued)

(58) Field of Classification Search
CPC ....... H04L 63/12; H04L 63/14; H04N 21/835; H04N 21/8166; H04N 21/4532; G06F 21/602; G06F 21/56; G06F 21/57; G06F 21/64; G06F 2221/2103
See application file for complete search history.

(56) References Cited

U.S. PATENT DOCUMENTS 7,702,107 B1    4/2010  Messing
8,676,922 B1 *  3/2014  Milner ................ H04L 41/0803
                                                    709/217
(Continued)

OTHER PUBLICATIONS

"Search Report Issued in European Patent Application No. 13883113.6", dated Mar. 3, 2017, 7 Pages.
(Continued)

*Primary Examiner* — Lisa Lewis
(74) *Attorney, Agent, or Firm* — Law Offices of Richard Chi; Richard Chi

(57) ABSTRACT

Systems and methods for verifying an application data modification are described herein. In one example, a method includes detecting modified application data in a computing device and determining the modified application data did not originate from an automatic program. The method also includes sending an identifier and the modified application data to a signing server. Furthermore, the method includes receiving encrypted data comprising the identifier and the modified application data from the signing server. Additionally, the method includes storing the encrypted data in the computing device.

16 Claims, 5 Drawing Sheets

(51) Int. Cl.
*G06F 21/57* (2013.01)
*G06F 21/64* (2013.01)
*G06F 21/56* (2013.01)
*G06F 21/60* (2013.01)
*H04N 21/45* (2011.01)
*H04N 21/81* (2011.01)
*H04N 21/835* (2011.01)

(52) U.S. Cl.
CPC .............. *G06F 21/64* (2013.01); *H04L 63/14* (2013.01); *H04N 21/4532* (2013.01); *H04N 21/8166* (2013.01); *H04N 21/835* (2013.01); *G06F 2221/2103* (2013.01)

(56) References Cited

U.S. PATENT DOCUMENTS

| | | |
|---|---|---|
| 2007/0297610 A1 | 12/2007 | Chen et al. |
| 2009/0282483 A1 | 11/2009 | Bennett |
| 2010/0275026 A1 | 10/2010 | Mclean |
| 2011/0047620 A1 | 2/2011 | Mahaffey et al. |
| 2014/0258481 A1* | 9/2014 | Lundell .................. H04L 67/34 709/222 |

OTHER PUBLICATIONS

Sharp, G., "Bug 718088—offer to re-set keyword.URL if it has a non-default value", Retrieved From <<https://bugzilla.mozilla.org/show_bug.cgi?id=718088>> Mar. 2012, 14 Pages.

http://blogs.msdn.com/b/ie/archive/2009/03/02/why-am-i-seeing-this-dialog.aspx?wa=wsignin1.0&PageIndex=2 Mar. 2, 2009, pp. 1-6.

http://blogs.msdn.com/b/ie/archive/2011/05/12/staying-in-control-of-your-default-search-provider.aspx May 12, 2011, pp. 1-4.

International Search Report for PCT Application, PCT/CN2013/074586, dated Jan. 30, 2014.

* cited by examiner

US 9,825,971 B2

ANONYMOUS SERVER BASED USER SETTINGS PROTECTION

CROSS-REFERENCE TO RELATED APPLICATIONS

Pursuant to 35 U.S.C. §371, this application is the United States National Stage Application of International Patent Application No. PCT/CN2013/074586, filed on Apr. 24, 2013, the contents of which are incorporated by reference as if set forth in their entirety herein.

BACKGROUND

Many software applications can execute operations based on information related to a user's preferences. For example, some software applications may execute operations based on user settings. In some examples, each software application can store data, such as user settings, on the computing device. In some embodiments, malicious software can alter the stored data, which can cause a user to inadvertently visit a malicious website or download a malicious file, among others.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for verifying an application data modification is described herein. The method can include detecting modified application data in a computing device and determining the modified application data did not originate from an automatic program. The method can also include sending an identifier and the modified application data to a signing server. Furthermore, the method can include receiving an encrypted data comprising the identifier and the modified application data from the signing server. Additionally, the method can include storing the encrypted data in the computing device.

Another embodiment provides one or more computer-readable storage media for verifying an application data modification comprising a plurality of instructions that, when executed by a processor, can cause the processor to detect modified application data in a computing device. The plurality of instructions can also cause the processor to request a challenge-response test from a signing server to determine that the modified application data did not originate from an automatic program. Additionally, the plurality of instructions can cause the processor to send an identifier and the modified application data to a signing server in response to a correct response to the challenge-response test. Furthermore, the plurality of instructions can cause the processor to receive an encrypted data comprising the identifier and the modified application data from the signing server and store the encrypted data in the computing device.

Another embodiment provides a computing device for verifying an application data modification comprising a processor to execute processor executable code and a storage device that stores processor executable code, wherein the processor executable code, when executed by the processor, can cause the processor to detect modified application data in a computing device. The processor executable code can also cause the processor to request a challenge-response test from a signing server to determine that the modified application data did not originate from an automatic program. Additionally, the processor executable code can cause the processor to send an identifier and the modified application data to a signing server in response to a correct response to the challenge-response test. Furthermore, the processor executable code can cause the processor to receive an encrypted data comprising the identifier and the modified application data from the signing server. The processor executable code can also cause the processor to store the encrypted data in the computing device.

Another embodiment provides a signing server for verifying an application data modification comprising a processor to execute processor executable code and a storage device that stores processor executable code, wherein the processor executable code, when executed by the processor, causes the processor to detect an identifier and modified application data from a computing device. The processor executable code can also cause the processor to send a challenge-response test to the computing device and encrypt the identifier and the modified application data in response to receiving a correct response to the challenge-response test. Furthermore, the processor executable code can also cause the processor to send the encrypted identifier and the modified application data to the computing device.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Many applications store user settings in a region of memory that stores application data. The stored user settings can be modified by software applications without a user initiating the modification of the user settings. In some examples, a software application can use deceptive techniques, such as hidden user interfaces, to lure users into inadvertently modifying user settings. The software applications may then gain control of various applications and hardware components of a computing device.

Various methods for verifying application data modifications are described herein. Application data, as referred to herein, can include user settings, home page preferences in web browsers, search engine preferences in a web browser, or user data stored by an application, among others. In some embodiments, a computing device can detect modified application data. In some examples, the computing device can verify that a malicious software application did not modify the application data. For example, a computing device can communicate with a signing server, which may provide a challenge-response test to verify that the modified application data did not originate from a malicious software application. In some embodiments, the server-initiated challenge-response test can include a Completely Automated Public Turing Test To Tell Computers and Humans Apart test (also referred to herein as CAPTCHA), a verification email, a text message, or any other suitable method that can determine if a software application has modified application data.

Figure 1:
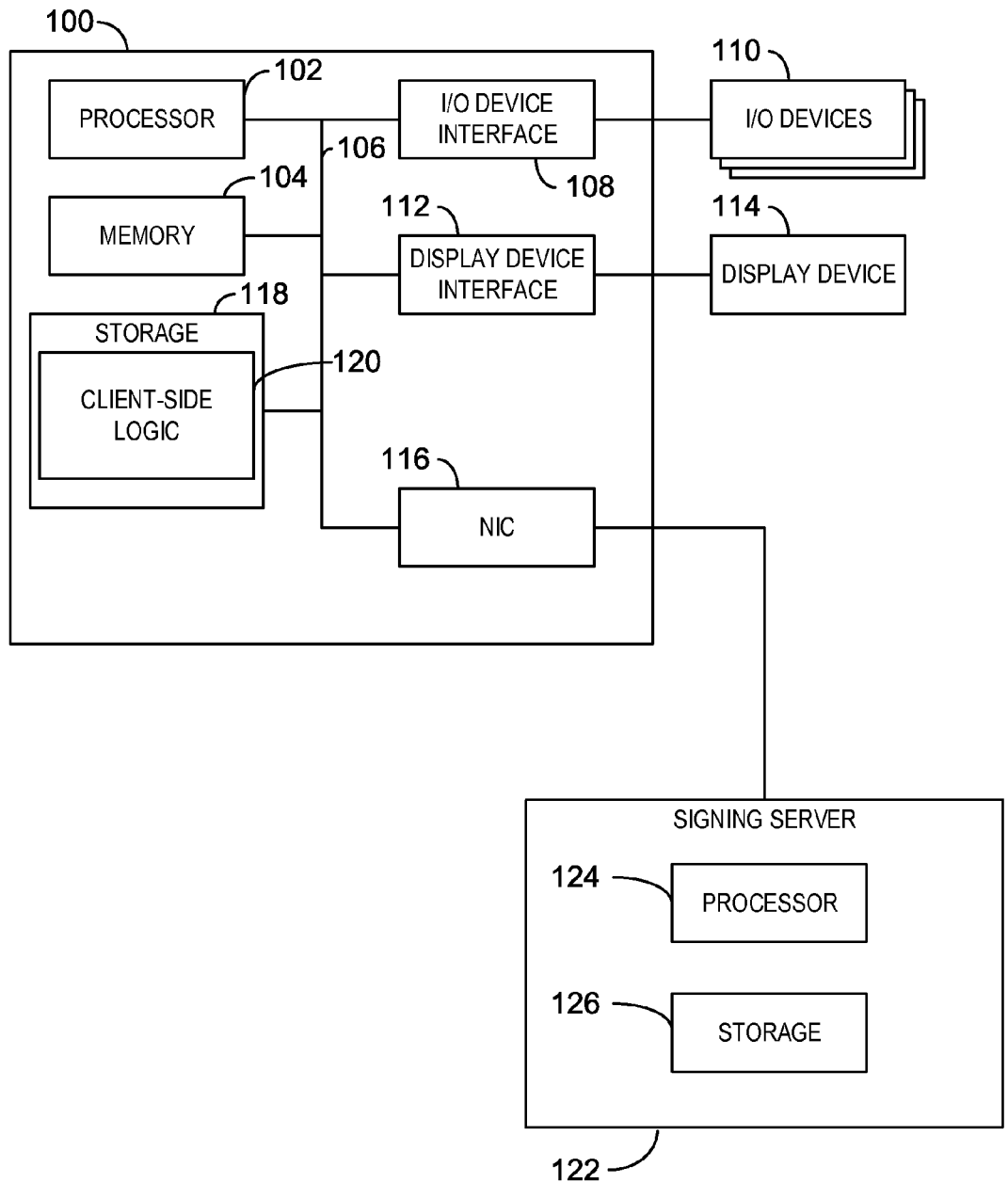
FIG. 1 is a block diagram of an example of a computing system that can verify application data modifications.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can verify application data modifications. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to verify application data modifications.

The processor 102 may be connected through a system bus 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted).

The storage 118 can include a hard drive, an optical drive, a USB flash drive, an array of drives, or any combinations thereof. The storage 118 may include client-side logic 120 that can verify that modified application data did not originate from an automatic program. An automatic program, as referred to herein, includes any application that can automatically modify application data without notifying a user. In some embodiments, the client-side logic 120 can include a protection mechanism that prevents the unauthorized modification of application data, such as the default home page setting for a web browser, among others. For example, the client-side logic 120 can store encrypted application data, which can be compared to the current application data. If the encrypted application data differs from the current application data, the client-side logic 120 can verify that an automatic program did not modify the current application data. In some embodiments, the client-side logic 120 retrieves a challenge-response test from a signing server 122 to verify that an automatic program did not modify the current application data. The challenge-response test can include a CAPTCHA test, or an alphanumeric string sent using any suitable contact information such as an email address, or phone number, among others.

In some embodiments, the client-side logic 120 can send an identifier and the modified application data to the signing server 122 in response to receiving a correct response to the challenge-response test. In some examples, the identifier can include an alphanumeric string that identifies a computing device. The signing server 122 may encrypt the identifier and the modified application data and send an encrypted data to the client-side logic 120. In some embodiments, the client-side logic 120 can store the encrypted data that includes the modified application data and the identifier in storage 118. The client-side logic 120 can detect future modified application data by decrypting the encrypted data and comparing the stored application data to the current application data.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Additionally, the signing server 122 may also include additional components not illustrated in FIG. 1 (e.g., a processor 124, storage 126, etc.). For example, the signing server 122 may include a processor 124 that is adapted to execute stored instructions, as well as storage 126 that stores instructions that are executable by the processor 124. Furthermore, any of the functionalities of the client-side logic 120 may be partially, or entirely, implemented in hardware and/or in the processor 102. For example, the functionality may be implemented with an application specific integrated circuit, in logic implemented in the processor 102, or in any other device.

Figure 2:
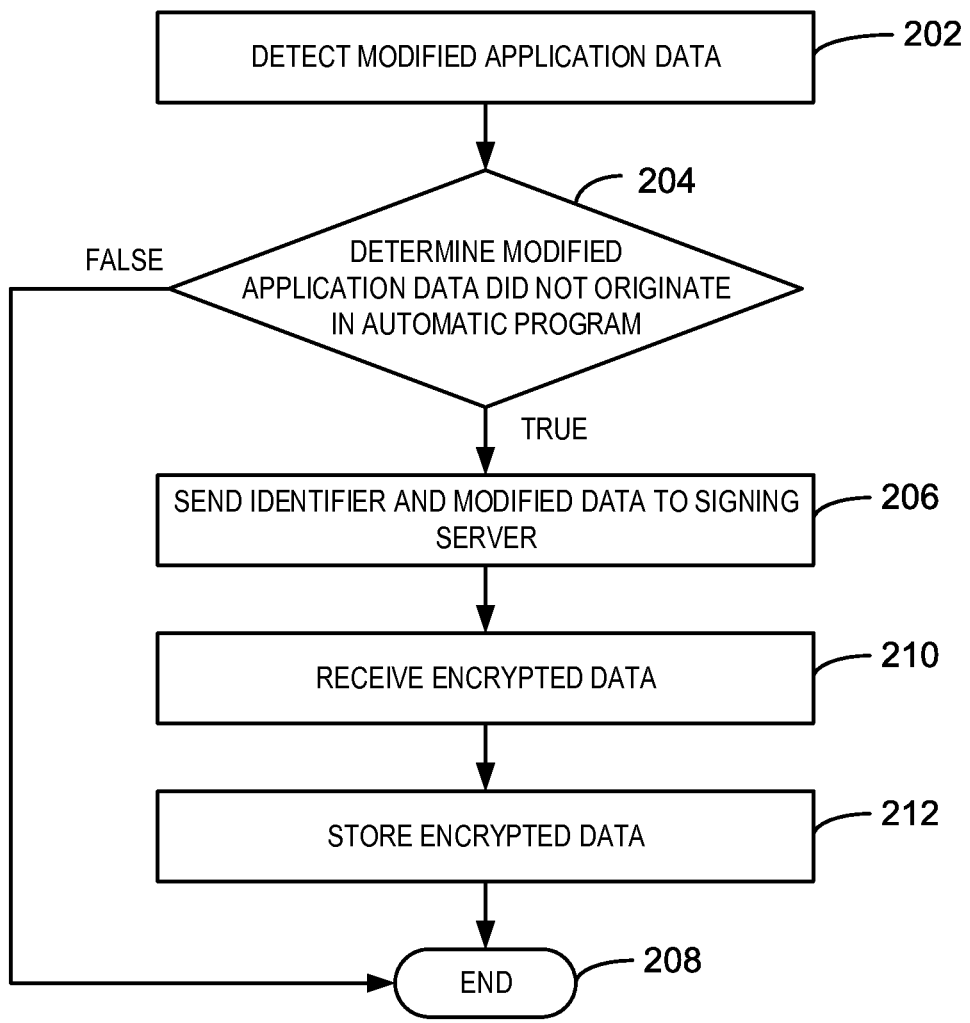
FIG. 2 is a process flow diagram of an example method for verifying an application data modification in a computing device.

FIG. 2 is a process flow diagram of an example method for verifying an application data modification in a computing device. The method 200 can be performed with any suitable computing device, such as the computing system 100 of FIG. 1.

At block 202, the client-side logic 120 can detect modified application data in a computing device. For example, the client-side logic 120 can detect a modified default home page for a web browser, default search provider for a web browser, or any other modified application data for any suitable application. In some embodiments, the client-side logic 120 can detect modified application data by comparing the current application data values to stored application data values. For example, the client-side logic 120 may store encrypted application data that includes default application data or previously encrypted application data. The client-side logic 120 may decrypt the encrypted application data to determine that the current application data has been modified.

At block 204, the client-side logic 120 can determine that the modified application data did not originate from an automatic program. In some embodiments, the client-side logic 120 can determine that the modified application data did not originate automatically from an application by using a challenge-response test. As discussed above, the challenge-response test can include a CAPTCHA test, an alphanumeric string sent via email or text message, or any other suitable challenge-response test. In some embodiments, the client-side logic 120 requests the challenge response test from a signing server 122. In some examples, the challenge-response test can be anonymous if the signing server 122 does not prompt the client-side logic 120 for login credentials. If the client-side logic 120 receives a correct response to the challenge-response test, the client-side logic 120 may determine that the modified application data did not originate from an automatic program. If the modified application data does not originate from an automatic program, the process flow continues at block 206. If the modified application data originated from an automatic program, the process flow ends at block 208.

At block 206, the client-side logic 120 can send an identifier and the modified application data to a signing server 122. As discussed above, an identifier can include any suitable alphanumeric that can identify a computing device. In some embodiments, the identifier can enable the signing server 122 to verify that the response to the challenge-response test was not previously derived from an automatic program.

At block 210, the client-side logic 120 can receive encrypted data comprising the identifier and the modified application data from the signing server 122. In some embodiments, the identifier and the modified application data can be encrypted with any suitable encryption method, such as RSA, among others. The signing server 122 may also send a public key to the client-side logic 120, so that the client-side logic 120 can decrypt the encrypted data.

At block 212, the client-side logic 120 can store the encrypted data in the computing device. For example, the client-side logic 120 can store the encrypted data in a region of memory that stores application data for applications, such as a registry of an operating system, in a memory device, or in any suitable storage device. In some embodiments, the encrypted data can be used to detect future modified application data.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. For example, the client-side logic 120 can send an identifier and modified application data to a signing server 122 prior to determining that the modified application data did not originate from an automatic program.

Figure 3:
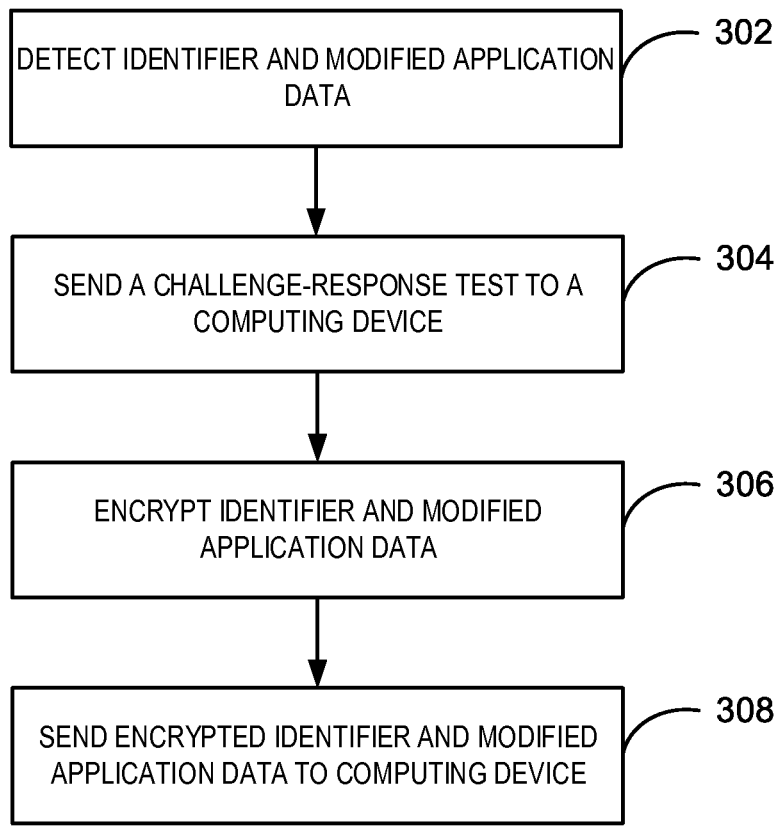
FIG. 3 is a process flow diagram of an example of a method for verifying an application data modification in a signing server.

FIG. 3 is a process flow diagram of an example of a method for verifying an application data modification in a signing server. The method 300 can be implemented with any suitable computing device, such as the signing server 122 of FIG. 1.

At block 302, the signing server 122 can detect an identifier and modified application data from a computing device. As discussed above, an identifier can include any suitable alphanumeric that can identify a computing device.

The modified application data may include any suitable user settings, home page preferences in web browsers, or user data stored by an application, among others.

At block 304, the signing server 122 can send a challenge-response test to the computing device. As discussed above, the challenge-response test can include a CAPTCHA test, or any suitable alphanumeric string sent to client-side logic 120 via an email or text, among others. The challenge-response test may also include requesting a time-dependent pseudo random number based on a security token that is synchronized between client-side logic 120 and the signing server 122. The challenge-response test can verify that an automatic program did not modify the application data by providing information to a user that the automatic program cannot detect. For example, an automatic program may not be capable of deciphering the image from a CAPTCHA test, or detecting the alphanumeric string sent via email or text message. In some embodiments, the signing server 122 can invalidate the CAPTCHA test after a predetermined period of time or after one solving attempt in order to make it more difficult for automatic programs to determine the correct response to the CAPTCHA test.

Additionally, the signing server 122 can also detect that an automatic program modified application data if the identifier is a duplicate. In some examples, the signing server 122 can store each identifier and determine if a duplicate identifier is received from client-side logic 120. In some embodiments, a duplicate identifier can enable the signing server 122 to verify that a response to a challenge-response test was provided by an automatic program.

At block 306, the signing server 122 can encrypt the identifier and the modified application data in response to receiving a correct response to the challenge-response test. In some embodiments, the encryption can include a public key stored in the client-side logic 120 and a private encryption key stored in the signing server 122. The signing server 122 may implement any suitable asymmetric encryption technique, among others, to encrypt the identifier and the modified application data. For example, the signing server 122 may use a private encryption key of any suitable number of bits along with an RSA encryption method to encrypt the identifier and modified application data.

At block 308, the signing server 122 can send the encrypted identifier and the modified application data to the computing device. In some embodiments, the computing device may store the encrypted identifier and modified application data. The encrypted identifier and modified application data can enable the computing device to detect future unauthenticated modified application data.

The process flow diagram of FIG. 3 is not intended to indicate that the steps of the method 300 are to be executed in any particular order, or that all of the steps of the method 300 are to be included in every case. Further, any number of additional steps may be included within the method 300, depending on the specific application. For example, the signing server 122 may also generate a public encryption key and send the public encryption key to a computing device.

Figure 4:
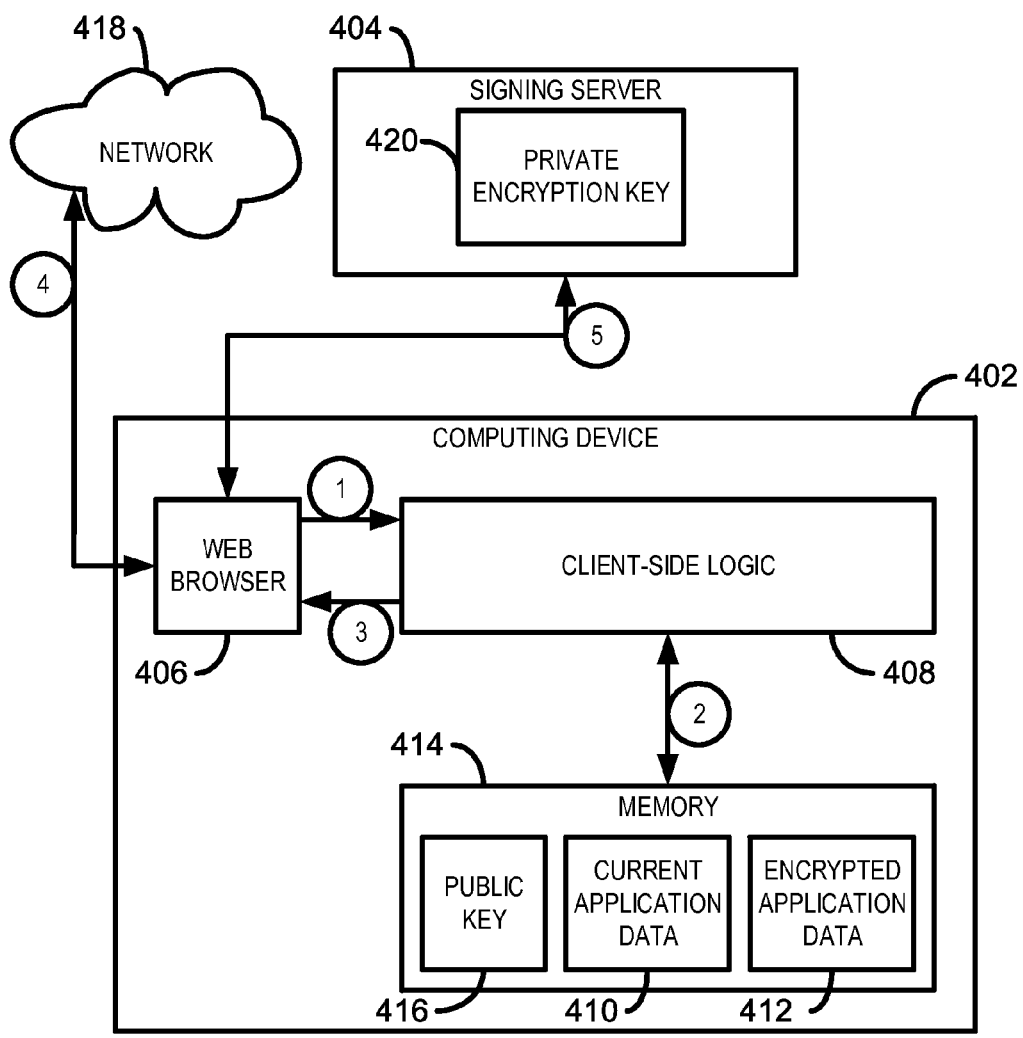
FIG. 4 is a block diagram of an example of a computing system communicating with a signing server to verify modified application data for a web browser.

FIG. 4 is a block diagram of an example of a computing system communicating with a signing server to verify modified application data for a web browser. In some embodiments, the computing device 402 can be any suitable computing device, such as the computing system 100 of FIG. 1. Additionally, the signing server 404 can be any suitable computing device, such as the signing server 122 of FIG. 1.

In some embodiments, a web browser 406 can detect an instruction to retrieve information from a web address (also referred to herein as a URL). In some examples, the client-side logic 408 can monitor (as indicated by the circled 1) each web address from which a web browser 406 is to retrieve information. In some embodiments, if the client-side logic 408 detects the selection of a home page, the client-side logic 408 can compare (as indicated by the circled 2) the web address of the home page, which can be stored as current application data 410, to encrypted application data 412 in memory 414. The encrypted application data 410 can correspond to the last authorized application data, such as the last authorized home page. For example, the last authorized home page may include a default home page setting or a home page previously authenticated by the signing server 404. If the current application data 410 differs from the encrypted application data 412, the client-side logic 408 determines that the current application data 410 has been modified.

In some examples, the client-side logic 408 may decrypt the encrypted application data 412 using a public key 416 stored in memory 414. In some embodiments, the client-side logic 408 can also retrieve an identifier from the encrypted application data 412. As discussed above, the identifier can include any suitable alphanumeric string that identifies a computing device.

In some embodiments, the client-side logic 408 instructs the web browser 406 to retrieve content from a web address in response to comparing the current application data 410 and the encrypted application data 412. For example, if the current application data 410 and the encrypted application data 412 are the same, the client-side logic 408 can determine that the current application data 410 has not been modified. The client-side logic 408 may instruct (as indicated by the circled 3) the web browser to retrieve information from a home page web address stored in the current application data 410. If the client-side logic 408 determines that the current application data 410 is not the same as the encrypted application data 412, the client-side logic 408 can instruct (as indicated by the circled 3) the web browser 406 to retrieve information from the web address stored in the encrypted application data 412 instead of the web address stored in the current application data 410. In some embodiments, the client-side logic 408 may also prompt a user to replace the current application data 410 with the encrypted application data 412.

In some embodiments, the web browser 406 can retrieve (as indicated by the circled 4) information from a web address through a network 418. For example, the web browser 406 can retrieve information from a web address stored in the current application data 410 or the encrypted application data 412. In some embodiments, the web browser 406 may send the information retrieved from a web address to a client-side logic 408, which can display a user interface that includes the values stored in the current application data 410 and the encrypted application data 412 along with the information retrieved from a web address. The user interface may request an indication to change the web address stored in the encrypted application data 412 to the web address stored in the current application data 410.

If the client-side logic 408 receives an indication to change the web address stored in the encrypted application data 412, the client-side logic 408 can connect to the signing server 404. In some examples, the signing server 404 can verify that an automatic program did not modify the current application data 410 by providing a challenge-response test, such as a CAPTCHA test, a text message, or an email, among others, to the client-side logic 408. In some embodiments, the signing server 404 can retrieve the solution from the client-side logic 408 using any suitable programming language or protocol, such as JavaScript, or HTTPS, among others. The challenge-response test can be periodically modified by the signing server 404 to protect against machine solving attempts by automatic programs. Additionally, the signing server 404 can ensure that challenge-response tests, such as CAPTCHA images, cannot accept a response after a predetermined time out period and that the challenge-response tests cannot be reused.

In some embodiments, the signing server 404 can receive an identifier and modified application data stored in the current application data 410 from the client-side logic 408 in response to receiving a correct solution to the challenge-response test. The signing server 404 can use a private encryption key 420 to encrypt the modified application data and the identifier received from the client-side logic 408. The signing server 404 can send (as indicated by the circled 5) the encrypted information as an encrypted to the client-side logic 408. In some embodiments, the signing server 404 can use any suitable asymmetric encryption technique with encryption keys of any suitable size to generate the encrypted data. The signing server 404 can also install a certificate on the computing device 402, so the computing device 402 can verify the encrypted data.

The block diagram of FIG. 4 is not intended to indicate that instructions or data are to be transmitted between components of the computing device 402 and the signing server 404 in any particular order. Further, any number of additional instructions may be transmitted between the computing device 402 and the signing server 404. For example, automatic programs may block access to the signing server internet protocol addresses. In some examples, the client-side logic 408 can detect whether the signing server internet protocol addresses are blocked by pinging the signing server 404. Furthermore, the automatic programs may intercept a response to a challenge-response test and replace a modified application data with a different value. In response, the client-side logic 408 can display the modified application data values through a verification protocol to prevent an unauthorized modification of application data. In some embodiments, automatic programs may also use a network proxy to modify application data. In response, the client-side logic 408 can update encryption techniques and hashing protocols periodically. In some embodiments, the client-side logic 408 can also send information to antivirus software to indicate if automatic programs reside in a computing device 402.

Figure 5:
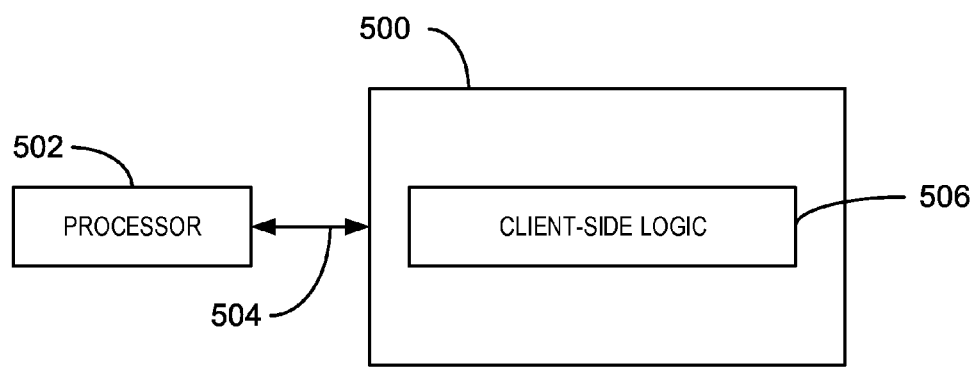
FIG. 5 is a block diagram showing a tangible, computer-readable storage media that can verify an application data modification.

FIG. 5 is a block diagram showing a tangible, computer-readable storage media 500 that can verify an application data modification. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include client-side logic 506. In some embodiments, the client-side logic 506 can verify that a modification to application data is not performed by an automatic program.

It is to be understood that any number of additional software components not shown in FIG. 5 may be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

What is claimed is:

1. A method for verifying an application data modification comprising:
   detecting modified application data in a computing device;
   determining the modified application data did not originate from an automatic program;
   sending an identifier and the modified application data to a signing server;
   receiving encrypted data comprising the identifier and the modified application data from the signing server; and
   storing the encrypted data in the computing device.

2. The method of claim 1, wherein determining the modified application data did not originate from the automatic program comprises:
   sending an alphanumeric string to a user based on contact information; and
   receiving the alphanumeric string as input.

3. The method of claim 2, comprising sending the alphanumeric string to the user via an email message or a text message.

4. The method of claim 1, wherein determining the modified application data did not originate from the automatic program comprises:
   requesting a challenge-response test from the signing server;
   receiving a challenge-response test; and
   detecting a correct response to the challenge-response test.

5. The method of claim 4, wherein the challenge-response test comprises a completely automated public turing test to tell computers and humans apart test.

6. The method of claim 1, wherein storing the encrypted data in the computing device comprises storing the encrypted data in a registry.

7. The method of claim 1, wherein the modified application data comprises a modified default home page or a modified default search provider.

8. A computing device for verifying an application data modification comprising:
   a processor to execute processor executable code;
   a storage device that stores processor executable code, wherein the processor executable code, when executed by the processor, causes the processor to:
   detect modified application data in a computing device;
   request a challenge-response test from a signing server to determine that the modified application data did not originate from an automatic program;
   send an identifier and the modified application data to a signing server in response to a correct response to the challenge-response test;
   receive encrypted data comprising the identifier and the modified application data from the signing server; and
   store the encrypted data in the computing device.

9. The computing device of claim 8, wherein the modified application data comprises a modified default home page or a modified default search provider.

10. The computing device of claim 8, wherein the challenge-response test comprises a completely automated public turing test to tell computers and humans apart test.

11. The computing device of claim 8, wherein the processor is to:

send an alphanumeric string to a user based on contact information; and receive the alphanumeric string as input.

12. The computing device of claim 11, wherein the processor is to send the alphanumeric string to the user via an email message or a text message.

13. An apparatus for verifying an application data modification comprising computer hardware configured to:

detect modified application data in a computing device;

determine the modified application data did not originate from an automatic program;

send an identifier and the modified application data to a signing server;

receive encrypted data comprising the identifier and the modified application data from the signing server; and store the encrypted data in the computing device.

14. The apparatus of claim 13, wherein the computer hardware is configured to determine the modified application data did not originate from the automatic program by:

sending an alphanumeric string to a user based on contact information; and receiving the alphanumeric string as input.

15. The apparatus of claim 13, wherein the computer hardware is configured to determine the modified application data did not originate from the automatic program by:

requesting a challenge-response test from the signing server;

receiving a challenge-response test; and detecting a correct response to the challenge-response test.

16. The apparatus of claim 13, wherein the computer hardware is configured to store the encrypted data in the computing device by storing the encrypted data in a registry.

* * * * *